United States Patent
Atake (10) Patent No.: US 9,770,950 B2
(45) Date of Patent: Sep. 26, 2017

(54) HEAVY DUTY TIRE

(71) Applicant: SUMITOMO RUBBER INDUSTRIES, LTD., Kobe-shi, Hyogo (JP)

(72) Inventor: Ikuo Atake, Kobe (JP)

(73) Assignee: SUMITOMO RUBBER INDUSTRIES LTD., Kobe-Shi, Hyogo (JP)

( * ) Notice: Subject to any disclaimer, the term of this patent is extended or adjusted under 35 U.S.C. 154(b) by 669 days.

(21) Appl. No.: 14/361,225

(22) PCT Filed: Nov. 27, 2012

(86) PCT No.: PCT/JP2012/080553
§ 371 (c)(1),
(2) Date: May 28, 2014

(87) PCT Pub. No.: WO2013/080944
PCT Pub. Date: Jun. 6, 2013

(65) Prior Publication Data
US 2014/0332133 A1    Nov. 13, 2014

(30) Foreign Application Priority Data
Nov. 29, 2011  (JP) ................................. 2011-260915

(51) Int. Cl.
*B60C 11/01* (2006.01)
*B60C 11/00* (2006.01)
*B60C 11/03* (2006.01)

(52) U.S. Cl.
CPC .......... *B60C 11/0083* (2013.01); *B60C 11/01* (2013.01); *B60C 11/0306* (2013.01);
(Continued)

(58) Field of Classification Search
CPC .................................................. B60C 11/0083
(Continued)

(56) References Cited

U.S. PATENT DOCUMENTS 5,553,646 A  * 9/1996 Ando ................ B60C 3/04
                                                         152/209.14
5,647,925 A    7/1997 Sumiya et al.
(Continued)

FOREIGN PATENT DOCUMENTS

CN      1521023 A     8/2004
EP    1 800 905 A2    6/2007
(Continued)

OTHER PUBLICATIONS

Machine Translation: WO 2004028836 A1; Irimiya Kenichirou; no date.*
(Continued)

*Primary Examiner* — Steven D Maki
*Assistant Examiner* — Kendra Ly
(74) *Attorney, Agent, or Firm* — Birch, Stewart, Kolasch & Birch, LLP (57) ABSTRACT

Shoulder drop wear and triangular wear are prevented. A heavy duty tire which includes a shoulder block includes a first arc portion having a radius of curvature, in which a tread contour includes an arc center at a tire equatorial surface at a 5% internal pressure state; and a second arc portion having a radius of curvature of which intersects with the first arc portion at an intersection. An arc center of the second arc portion is located on a radial line passing through the intersection. A ratio of the radii of curvature is between 0.2 and 0.5. A ratio between a tire radial direction distance from an equatorial point to a tread edge and a radial direction distance from the equatorial point to a virtual tread edge on
(Continued)

a line extending from the first arc portion is equal to or higher than 0.5 or lower than 1.0.

4 Claims, 8 Drawing Sheets

(52) U.S. Cl.
CPC ..... *B60C 11/0332* (2013.01); *B60C 2011/013* (2013.01); *B60C 2200/06* (2013.01)

(58) Field of Classification Search
USPC .................................................. 152/209.14
See application file for complete search history.

(56) References Cited

U.S. PATENT DOCUMENTS

| | | | |
|---|---|---|---|
| 2004/0154716 A1 | 8/2004 | Kimishima et al. | |
| 2005/0006018 A1* | 1/2005 | Maruoka | B60C 11/0083 152/209.14 |
| 2011/0315288 A1* | 12/2011 | Yamahira | B60C 11/0083 152/209.14 |

FOREIGN PATENT DOCUMENTS

| | | | |
|---|---|---|---|
| JP | 02204103 A | * | 8/1990 |
| JP | 06-227212 A | | 8/1994 |
| JP | 07-164823 A | | 6/1995 |
| JP | 07-164824 A | | 6/1995 |
| JP | 09207520 A | * | 8/1997 |
| JP | 11-059127 A | | 3/1999 |
| JP | 2001171317 A | * | 6/2001 |
| JP | 2003-072323 A | | 3/2003 |
| JP | 2003-182309 A | | 7/2003 |
| WO | WO 2004/028836 A1 | | 4/2004 |
| WO | WO 2004028836 A1 | * | 4/2004 ............ B60C 11/00 |

OTHER PUBLICATIONS

Machine Translation: JP 09207520 A; Kuwajima, Masatoshi; no date.*
Machine Translation: JP 2001171317 A; Tsuda, Satoshi; no date.*
Machine Translation: JP 02204103 A; Takada, Yoshiyuki; no date.*

* cited by examiner

HEAVY DUTY TIRE

TECHNICAL FIELD

The present invention relates to a heavy duty tire that suppresses occurrence of shoulder wear and triangular wear.

BACKGROUND ART

Figure 7A:
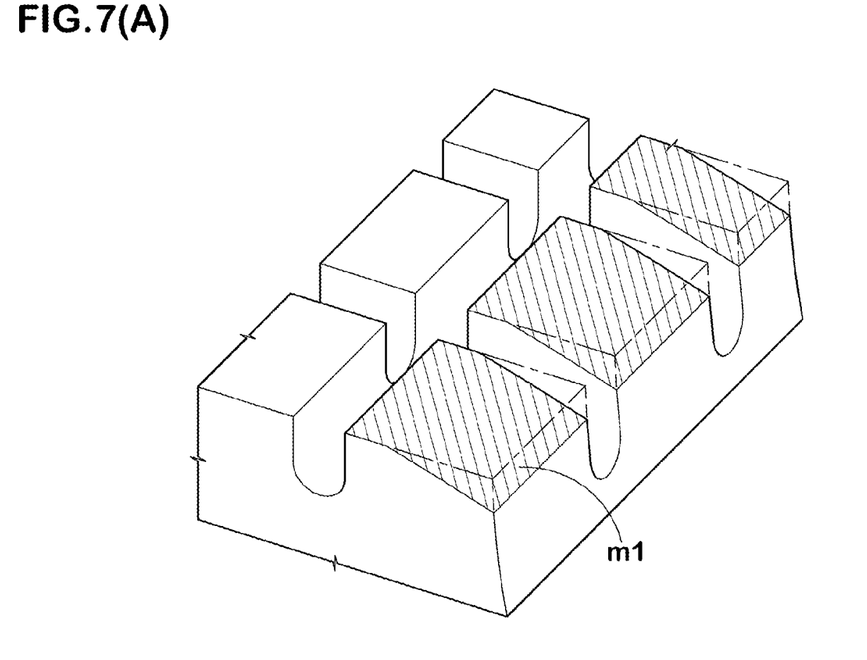
FIG. 7(A) is a perspective view of shoulder wear.

Heavy duty tires widely employed for trucks, buses, and the like are a so-called single-crown type in which the profile line of a surface of a tread portion (tread profile line) is formed by a single arc having an arc center on a tire equatorial plane. However, such a single-crown tire has a large tire radius difference between the tire equatorial plane and the tread edge. Thus, there is a problem that a slip occurs between the tread surface of the tread edge side and the road surface, thereby resulting in so-called shoulder wear m1 (shown in FIG. 7(A)).

Figure 8A:
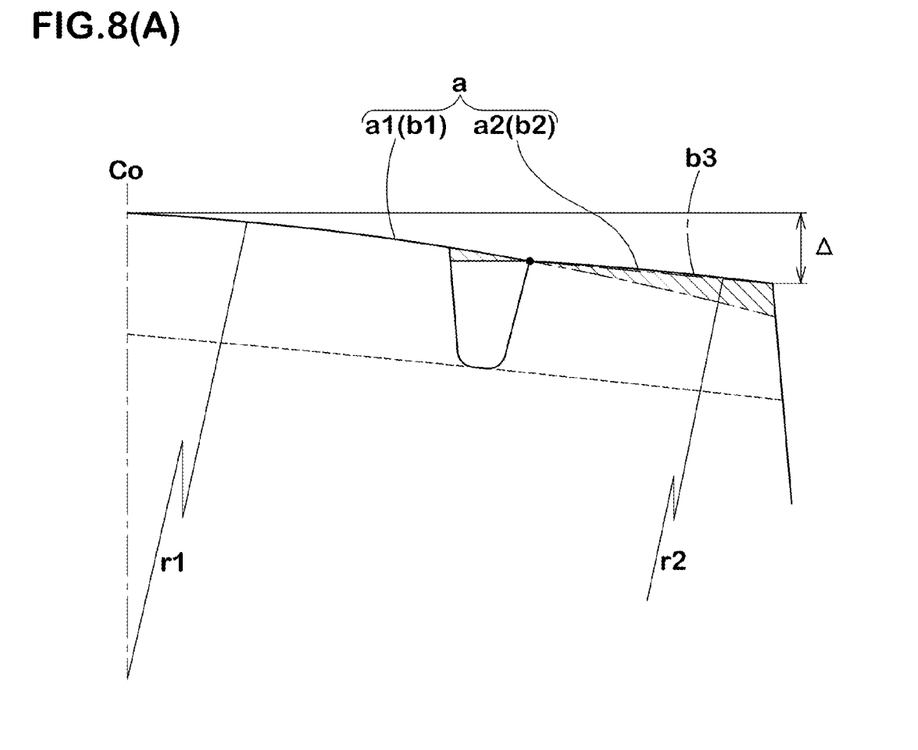
FIG. 8(A) is a diagram illustrating a conventional tread profile line.

Accordingly, Patent Literatures 1, 2, and others each suggest a tire that has a tread profile line (a) as schematically shown in FIG. 8(A), for example. The tread profile line (a) is divided into a crown area profile line part (a1) on the tire equatorial plane side and a shoulder area profile line part (a2) on the tread edge side. The crown area profile line part (a1) is formed by a first arc (b1) with a radius of curvature (r1) having an arc center on a tire equatorial plane (Co). The shoulder area profile line part (a2) is formed by a second arc (b2) with a radius of curvature (r2) larger than the first arc (b1) or a straight line (b3). In such a tire, compared to the single-crown tire, a tire radius difference A between the tire equatorial plane side and the tread edge side is smaller, and thus occurrence of shoulder wear (m1) (shown in FIG. 7(A)) is suppressed.

Figure 7B:
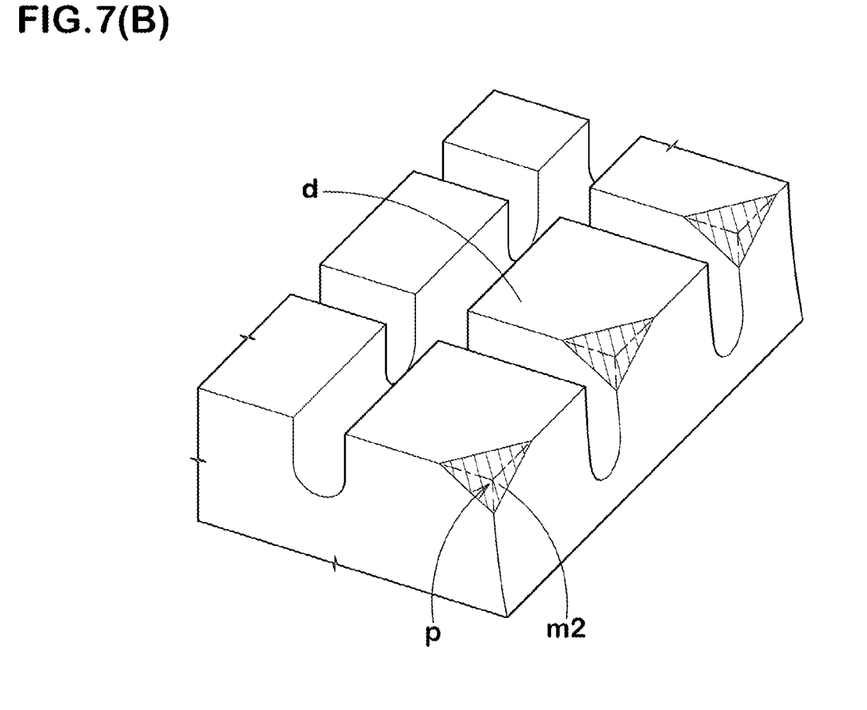
FIG. 7(B) is a perspective view of triangular wear.

As shown in FIG. 7(B), however, it has been found that so-called triangular wear (m2) occurs at shoulder blocks (d) disposed in the shoulder region (a2). The triangular wear (m2) develops in a triangular shape at corner portions (p) on an earlier ground-contact side and a tire axially outside of the shoulder blocks (d) as origin points.

Figure 8B:
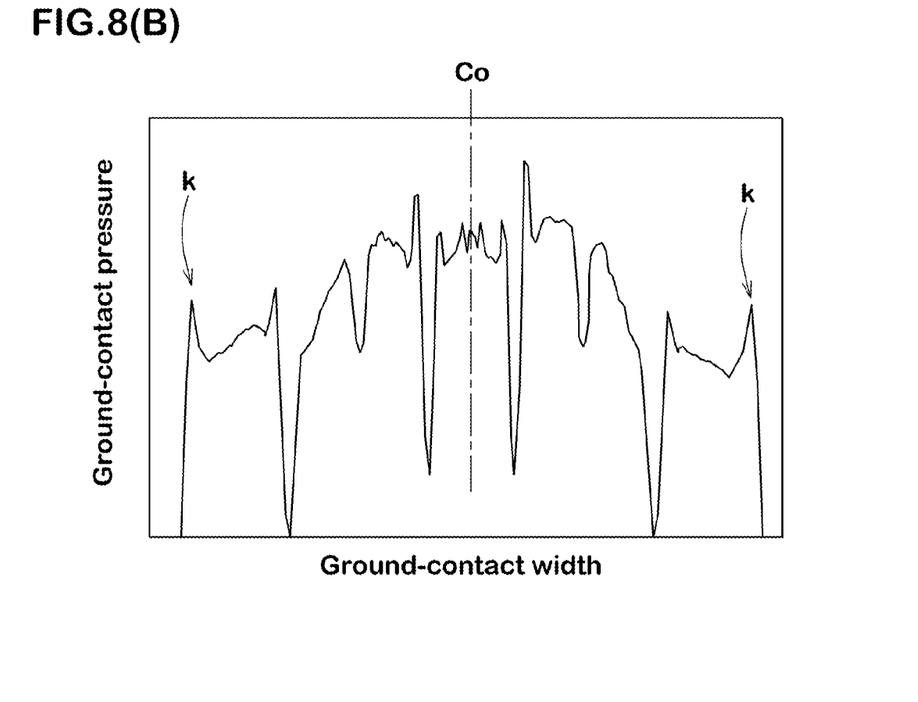
FIG. 8(B) is a graph illustrating a ground-contact pressure distribution of the tread profile line.

A possible cause of occurrence of the triangular wear (m2) is as described below. Specifically, when the shoulder area profile line part (a2) is formed by the second arc (b2) with the large radius of curvature (r2) or the straight line (b3), in ground-contact pressure distribution of the shoulder block (d) as illustrated in FIG. 8(B), a ground-contact pressure rising portion (k) with a peak-like rise of ground-contact pressure occurs at the tire axially outside end of the shoulder block (d). On the other hand, the front tire is a driven wheel, and thus at the rotation of the tire, a slip occurs between the road surface and the tire on the earlier ground-contact side of the block. The amount of wear is almost proportional to the product of ground-contact pressure and slip amount. Therefore, it is considered that the triangular wear (m2) develops, within the blocks, at the corner portions (p) on the tire axially outside end with a peak-like rise in ground-contact pressure and on the earlier ground-contact side with a larger slip, as origin points of wear.

RELATED ART

Patent Documents

Patent Document 1: Japanese Unexamined Patent Application Publication No. H07-164823
Patent Document 2: Japanese Unexamined Patent Application Publication No. 2003-182309

SUMMARY OF INVENTION

Technical Problem

An object of the present invention is to provide a heavy duty tire that suppresses a rise in ground-contact pressure at tread edges while reducing a tire radius difference between the tire equatorial plane side and the tread edge side and suppresses occurrence of both shoulder wear and triangular wear.

To solve the problem, in claim 1 of the present invention, a heavy duty tire configured such that the tread portion is provided with circumferential main grooves including a shoulder circumferential main groove positioned closest to a tread edge to form a shoulder land portion between the shoulder circumferential main groove and the tread edge, and the shoulder land portion is divided into a plurality of shoulder blocks by shoulder lateral grooves spaced in a tire circumferential direction. On a meridional cross-section of a tire in a 5% internal pressure state where the tire is mounted on a normal rim and charged with a 5% internal pressure as a normal internal pressure, a tread profile line on a surface of the tread portion is formed from a first arc portion with a radius of curvature R1 having an arc center on a tire equatorial plane and a second arc portion with a radius of curvature R2 intersecting with the first arc portion at an intersection point Q, an arc center of the second arc portion is positioned on a radial line passing through the intersection point Q, and a ratio He/H between a tire radial distance He from an equatorial point at which the tread profile line intersects the tire equatorial plane to the tread edge and a radial distance H from the equatorial point to a virtual tread edge at which a radial line passing through the tread edge intersects an extended line of the first arc portion is 0.5 or more and less than 1.0. A ratio R2/R1 between the radius of curvature R2 and the radius of curvature R1 is 0.2 or more and 0.5 or less.

In claim 2, when the shoulder land portion is divided by a width center line of the shoulder land portion into a tire axially outside land portion and a tire axially inside land portion, in a ground-contact plane of a tire when a normal load is applied to the tire in a normal state that is mounted on a normal rim and charged with a normal internal pressure, a ratio PSo/PSi between an average PSo of ground-contact pressure at the outside land portion and an average Psi of ground-contact pressure at the inside land portion is 0.9 or more and 1.0 or less.

In claim 3, a block outside edge at which a block tread surface of the shoulder block and a block wall surface on the tire axial outside intersects has a convex curve with a protrusion protruding most outwardly in the tire axial direction between both end points of the block outside edge in the tire circumferential direction, and tire axial distance between the both end points and the protrusion is 2 mm or more and 5 mm or less.

The tire shape in the "5% internal pressure state" is generally almost equal to the tire shape in a vulcanized mold. By specifying the shape of a mold surface in the vulcanized mold, the tire shape in the 5% internal pressure state can be controlled. In the specification, unless otherwise specified, the dimensions and others of components of a tire are defined in the 5% internal pressure state.

The "tread edge" refers to the position of the tread surface at the tire axially outermost end where the tire contacts the ground when the normal load is applied to the normal-state tire mounted on the normal rim and charged with the normal internal pressure.

The "normal rim" refers to a rim specified for each tire by a standard system including tire standards. For example, the normal rim is a standard rim under JATMA, "Design Rim" under TRA, or "Measuring Rim" under ETRTO. The "normal internal pressure" refers to a pneumatic pressure specified for each tire by the standards, which is the maximum pneumatic pressure under JATMA, the maximum value shown in the table "TIRE LOAD LIMITS AT VARIOUS COLD INFLATION PRESSURES" under TRA, or "INFLATION PRESSURE" under ETRTO. The "normal load" refers to a load specified for each tire by the standards, which is the maximum load capability under JATMA, the maximum value shown in the table "TIRE LOAD LIMITS AT VARIOUS COLD INFLATION PRESSURES" under TRA, or "LOAD CAPACITY" under ETRTO.

Advantageous Effects of Invention

In a tire according to the present invention, the tread profile line is formed by the first arc portion having the arc center on the tire equatorial plane, and the second arc portion that intersects with the first arc portion at the intersection point Q. The arc center of the second arc portion is positioned on the radial line passing through the intersection point Q.

Therefore, even when the radius of curvature R2 of the second arc portion is set smaller than the radius of curvature R1 of the first arc portion, a tire radius difference between the tire equatorial plane side and the tread edge side can be sufficiently reduced. This makes it possible to suppress occurrence of shoulder wear. In addition, since the radius of curvature R2 of the second arc portion is as small as 0.2 to 0.5 times the radius of curvature R1, it is possible to suppress peak-like rise of the ground-contact pressure at the tread edges. This makes it possible to suppress the shoulder wear and triangular wear at the same time.

If the radius of curvature R2 becomes larger than 0.5 times the radius of curvature R1, the ground-contact pressure increases at the tread edges. This makes it difficult to suppress occurrence of triangular wear. On the other hand, if the radius of curvature R2 becomes smaller than 0.2 times the radius of curvature R1, there causes a large tire radius difference between the tire equatorial plane side and the tread edge side. This makes it difficult to suppress occurrence of shoulder wear.

Similarly, if the tire radial distance He from the equatorial point to the tread edge becomes smaller than 0.5 times the radial distance H from the equatorial point to the virtual tread edge, the ground-contact pressure increases at the tread edge. This makes it difficult to suppress occurrence of triangular wear. On the other hand, if the tire radial distance He becomes larger than 1.0 time the radial distance H, the tire radius difference between the tire equatorial plane side and the tread edge side becomes larger than that in the case of the single-crown tire. This makes it impossible to suppress occurrence of shoulder wear.

DESCRIPTION OF EMBODIMENTS

An embodiment of the present invention will be described below in detail.

Figure 1:
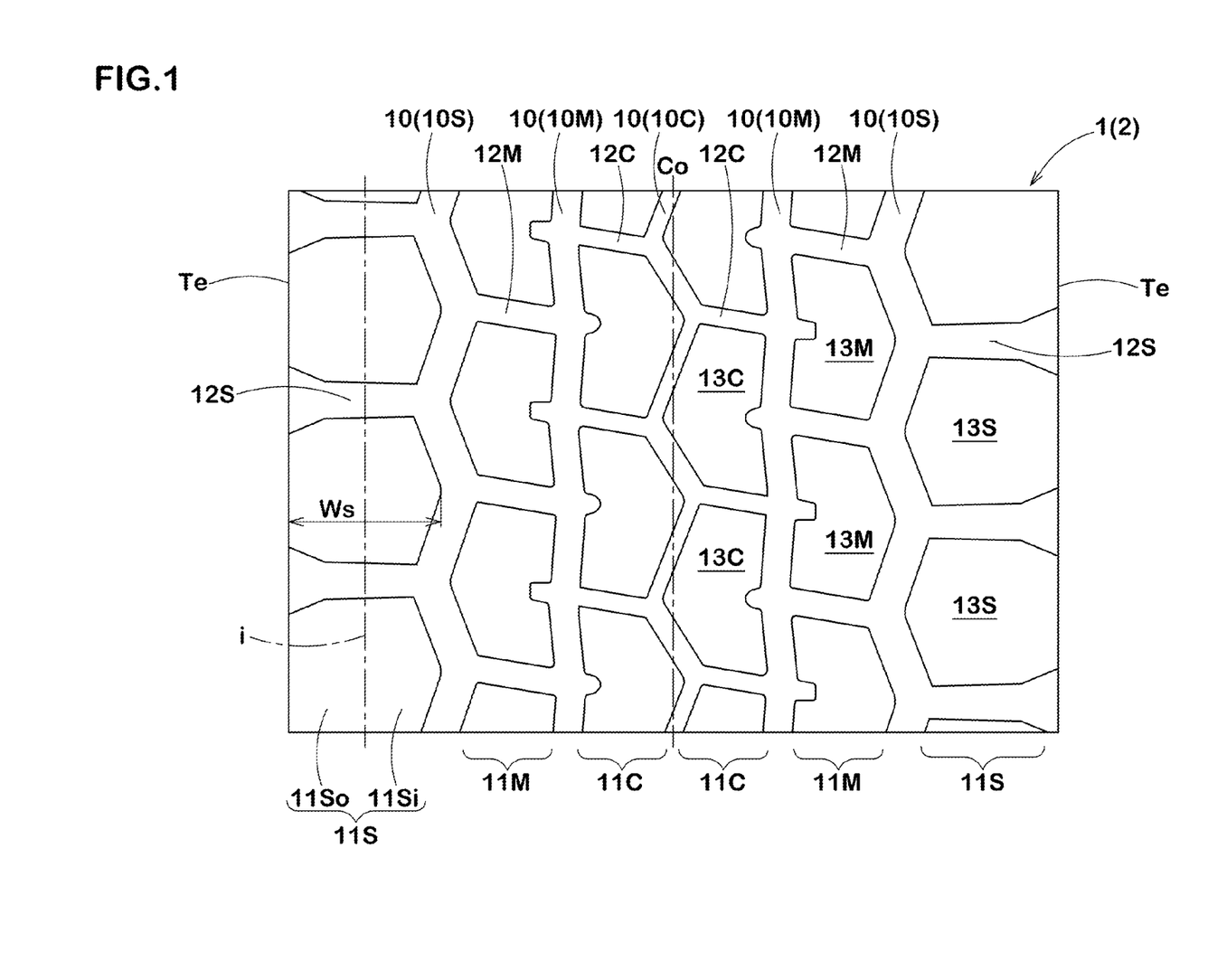
FIG. 1 is a development view of a tread pattern in one embodiment of a pneumatic tire of the present invention that is developed in a plane.

Referring to FIG. 1, a heavy duty tire 1 in the embodiment of the present invention includes at tread portions 2 circumferential main grooves 10 including shoulder circumferential main grooves 10S positioned closest to tread edges. This s forms shoulder land portions 11S between the shoulder circumferential main grooves 10S and tread edges Te. The shoulder land portions 11S are divided into a plurality of shoulder blocks 13S by shoulder lateral grooves 12S provided with space therebetween in the tire circumferential direction.

Specifically, the heavy duty tire 1 of this example is a so-called all-season tire for truck/bus that can be used throughout the year from the winter to summer seasons. The circumferential main grooves 10 are comprised of total five circumferential main grooves: the shoulder circumferential main grooves 10S, middle circumferential main grooves 10M on an inner side, and center circumferential main groove 10C on a further inner side. Accordingly, the tread portions 2 are divided into shoulder land portions 11S, 11S, middle land portions 11M, 11M on the inner side, and center land portions 11C, 11C on the further inner side. In this example, the middle land portions 11M are divided into a plurality of middle blocks 13M by middle lateral grooves 12M provided with space therebetween in the tire circumferential direction. The center land portions 11C are divided into a plurality of center blocks 13C by center lateral grooves 12C provided with space therebetween in the tire circumferential direction.

There are no particular limitations on width and depth of the circumferential main grooves 10, and conventional sizes can be preferably adopted. For example, the groove width generally falls within a range of 3 to 20 mm. The groove depth generally falls within a range of 9 to 22 mm. In this example, the circumferential main grooves 10 are zig-zag grooves. However, the circumferential main grooves 10 may be straight grooves, and the number of the circumferential main grooves 10 may be selected from 3, 4, 5, 6, and others. In addition, the land portions 11M and 11C other than the shoulder land portions 11S are not limited to block columns. For example, various tread patterns can be adopted for the land portions 11M and 11C such as ribs continued in the circumferential direction, for example.

Figure 2:
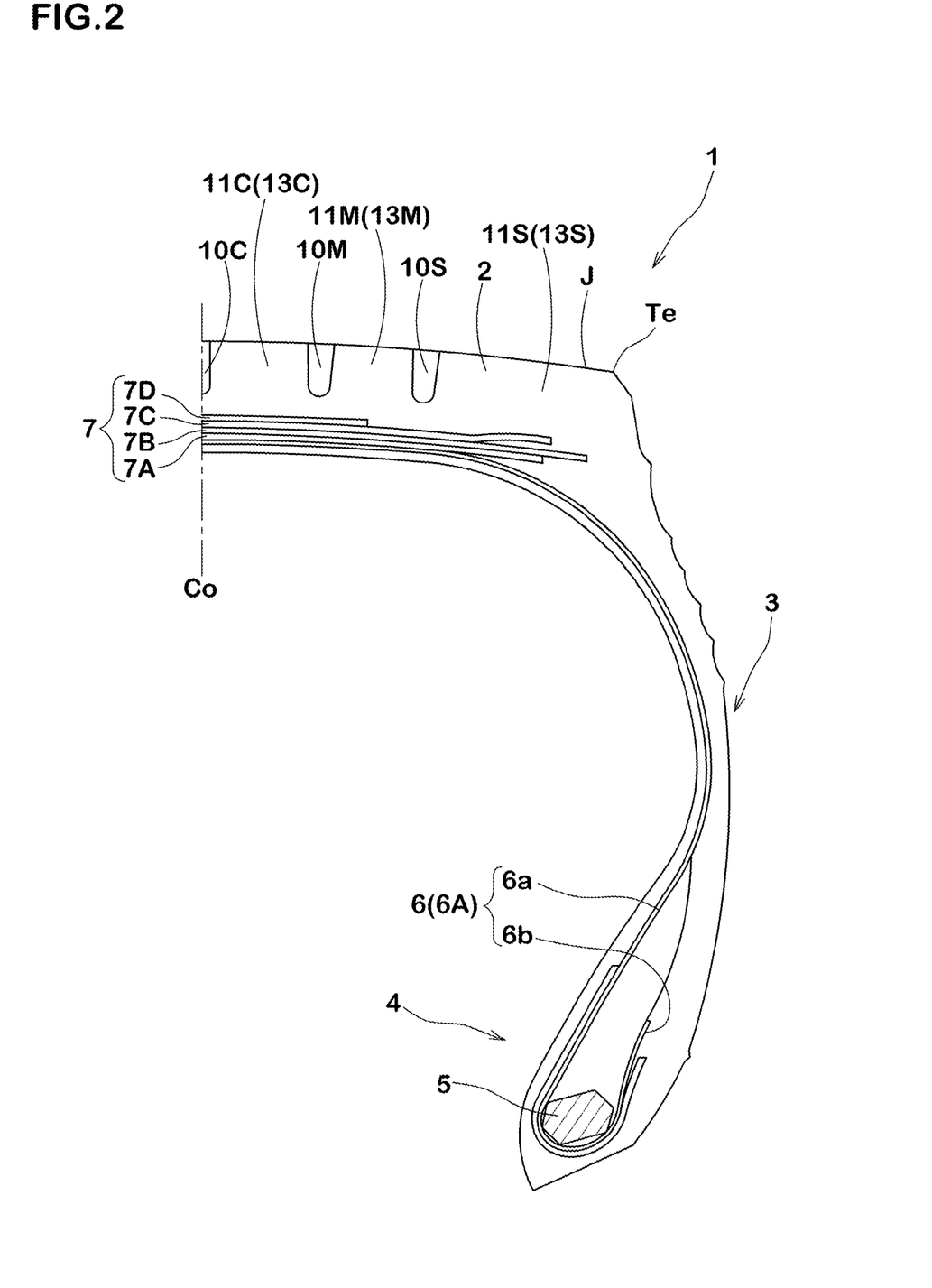
FIG. 2 is a meridional cross-sectional view of the pneumatic tire.

The heavy duty tire 1, as shown in FIG. 2, forms a known structure including a carcass 6 extending from the tread portion 2 through a side-wall portion 3 to a bead core 5 of a bead portion 4, and a belt layer 7 disposed on a radially outside of the carcass 6 and on an interior of the tread portion 2.

The carcass 6 is formed by one or more, in this example one carcass ply 6A in which a carcass cord is arranged at an angle of 70 to 90°, for example, with respect to the tire equatorial plane Co. The carcass ply 6A in this example includes a continuous ply folded portion 6b that is folded over the bead cores 5 outwardly from the tire axial inside on both ends of a ply main body portion 6a spreading across the bead cores 5, 5. The belt layer 7 is formed from two or more belt plies in which belt cords are arranged at an angle of 10 to 60°, for example, with respect to the tire equatorial plane Co. In this example, the belt layer 7 is formed from four belt plies 7(A) to 7D that are arranged sequentially from the tire radial inside. In addition, the belt layer 7 includes one or more places where the belt cords intersect with each other between the plies. This enhances belt rigidity so that almost the entire width of the tread portions 2 has hoop effect and reinforces the tire.

At the heavy duty tire 1, a tread profile line J as a profile line of a surface of the tread portion 2 on a tire meridional cross-section in 5% internal pressure state where the tire is mounted on a normal rim and charged with a 5% internal pressure as a normal internal pressure, is regulated as described below.

Figure 3:
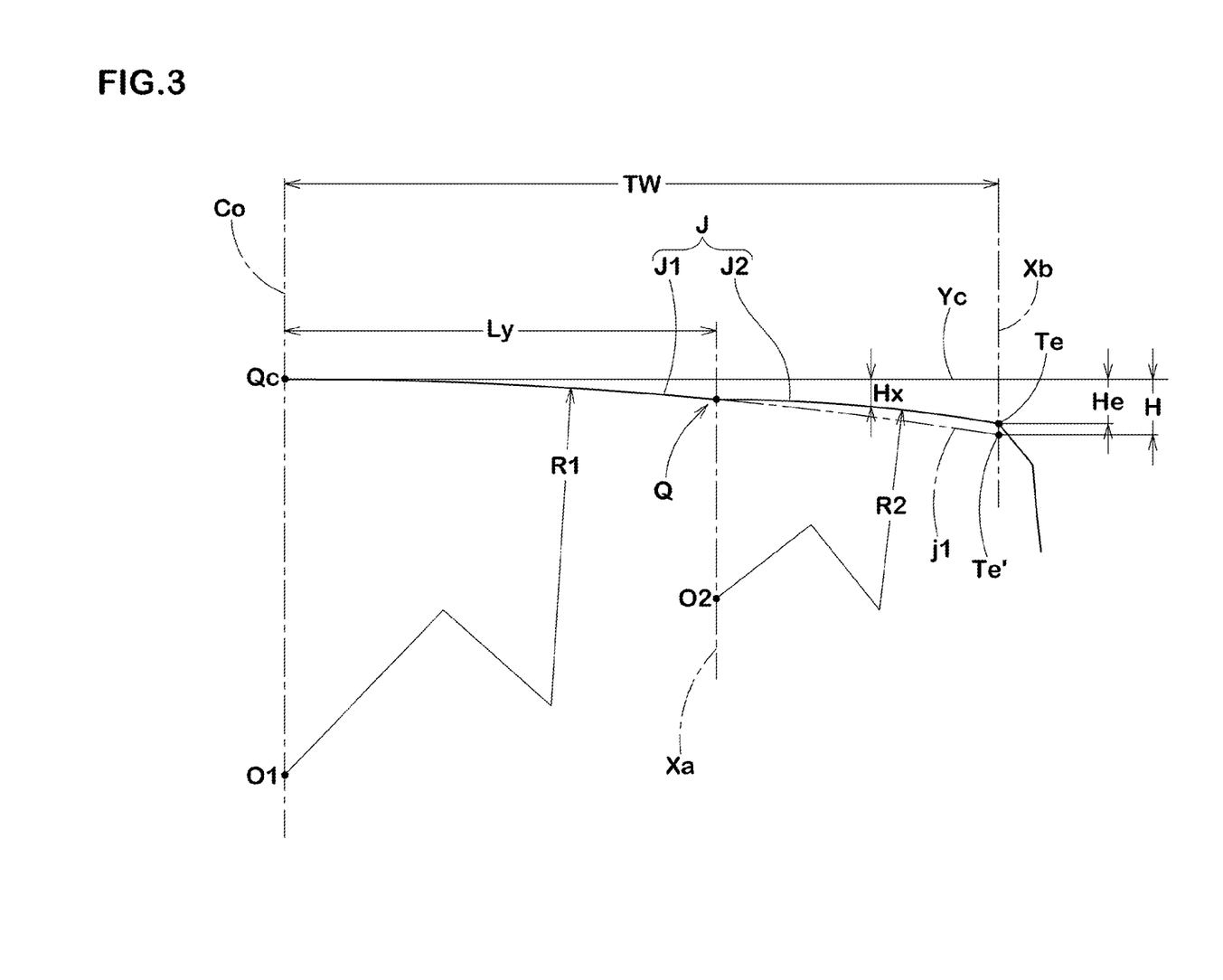
FIG. 3 is a linear diagram illustrating a tread profile line.

The tread profile line J, as shown in FIG. 3, is formed from a first arc portion J1 with a radius of curvature R1 that has an arc center O1 on the tire equatorial plane Co, and a second arc portion J2 with a radius of curvature R2 that intersects with the first arc portion J1 at an intersection point Q.

An arc center O2 of the second arc portion J2 is positioned on a radial line Xa passing through the intersection point Q. The ratio R2/R1 between the radius of curvature R2 of the second arc portion J2 and the radius of curvature R1 of the first arc portion J1 is set within a range of 0.2 or more and 0.5 or less.

In the tread profile line J, the ratio He/H between a tire radial distance He from the equatorial point Qc to the tread edge Te and a radial distance H from the equatorial point Qc to a virtual tread edge Te' is set within a range of 0.5 or more and less than 1.0. The equatorial point Qc is a point at which the tread profile line J intersects with the tire equatorial plane Co. The virtual tread edge Te' is a point at which a radial line Xb passing through the tread edge Te intersects with an extended line j1 of the first arc portion J1.

As in the foregoing, the tread profile line J is formed from the first arc portion J1 having the arc center O1 on the tire equatorial plane Co and the second arc portion J2 having the arc center O2 on the radial line Xa passing through the intersection point Q. Thus, it is possible to position the second arc portion J2 on the radially outer side than the extended line j1 of the first arc portion J1 while setting the radius of curvature R2 of the second arc portion J2 to be smaller than the radius of curvature R1 of the first arc portion J1. That is, it is possible to reduce a tire radius difference between the tire equatorial plane Co side and the tread edge Te side, thereby suppressing occurrence of shoulder wear.

In addition, since the radius of the curvature R2 is small, a radial distance Hx between the second arc portion J2 and a tire axial line Yc passing through the equatorial point Qc sharply increases with increasing proximity to the tread edge Te as compared to the case where the radius of curvature R2 is large or straight. Therefore, it is possible to suppress a peak-like rise in ground-contact pressure at the tread edge Te, thereby producing the effect of suppressing triangular wear.

when the radius of curvature R2 becomes large in excess of 0.5 times the radius of curvature R1, the ground-contact pressure at the tread edge Te increases, which makes it difficult to suppress occurrence of triangular wear. In contrast, when the radius of curvature R2 is smaller than 0.2 times the radius of curvature R1, the degree of increase in the distance Hx becomes excessive. This leads to a slip on the road surface and makes it difficult to suppress occurrence of shoulder wear.

In addition, when the distance He is smaller than 0.5 times the distance H, the ground-contact pressure at the tread edge Te increases, which makes it difficult to suppress occurrence of triangular wear. In contrast, when the distance He is equal to or more than 1.0 time the distance H, the tire radius difference between the tire equatorial plane Co side and the tread edge Te side becomes larger than that in the case of a single-crown tire, which leads to worsening of shoulder wear.

From the foregoing point of view, the lower limit for the curvature radius ratio R2/R1 is preferably 0.25 or more, and the upper limit for the same is preferably 0.45 or less. The lower limit for the distance ratio He/H is preferably 0.55 or more, and the upper limit for the same is preferably 0.95 or less.

There is no particular restriction on the position of the intersection point Q. For example, a tire axial distance Ly from the tire equatorial plane Co to the intersection point Q generally falls within a range of 0.4 to 0.8 times a tire axial distance TW from the tire equatorial plane Co to the tread edge Te (also called half tread width).

Next, to effectively produce the foregoing advantage, the ground-contact pressure at the shoulder land portions 11S is preferably uniform to some extent. Specifically, as shown in FIG. 1, first, the shoulder land portions 11S are each virtually divided into a land portion 11So on the tire axially outer side than a width center line (i) of the shoulder land portion 11S and a land portion 11Si on the tire axially inner side of the same. The width center line (i) refers to a circumferential line passing through a center of a tire axial land portion width Ws of the shoulder land portion 11S.

In addition, on a ground-contact plane F (shown in FIG. 4) of the tire where the normal load is applied to the tire in the normal state where the tire is mounted on the normal rim and charged with the normal internal pressure, the ratio PSo/PSi between an average PSo of ground-contact pressure at the outside land portion 11So and an average PSi of ground-contact pressure at the inside land portion 11Si is set within a range of 0.9 or more and 1.0 or less. The averages PSo and PSi of the ground-contact pressure at the land portions 11So and 11Si can be obtained by using a commercially available pressure distribution measurement device or the like to determine ground-contact pressure distribution on the entire shoulder land portion 11S within the ground-contact plane F and analyzing the ground-contact pressure distribution.

when the ratio PSo/PSi falls below 0.9, the ground-contact pressure becomes too low at the outside land portion 11So and a large slip occurs at the land portion 11So, which increases the tendency to cause shoulder wear. In contrast, when the ratio PSo/PSi exceeds 1.0, the ground-contact pressure becomes too high at the outside land portion 11So, and wear energy becomes high at the earlier ground-contact side and the corner portions of the tread edge Te, which increases the tendency to cause triangular wear. The foregoing ground-contact pressure ratio PSo/PSi can be controlled by the shape of the tread profile line J, width dimension of the belt layer 7, thickness distribution of tread rubber, and others.

Figure 5:
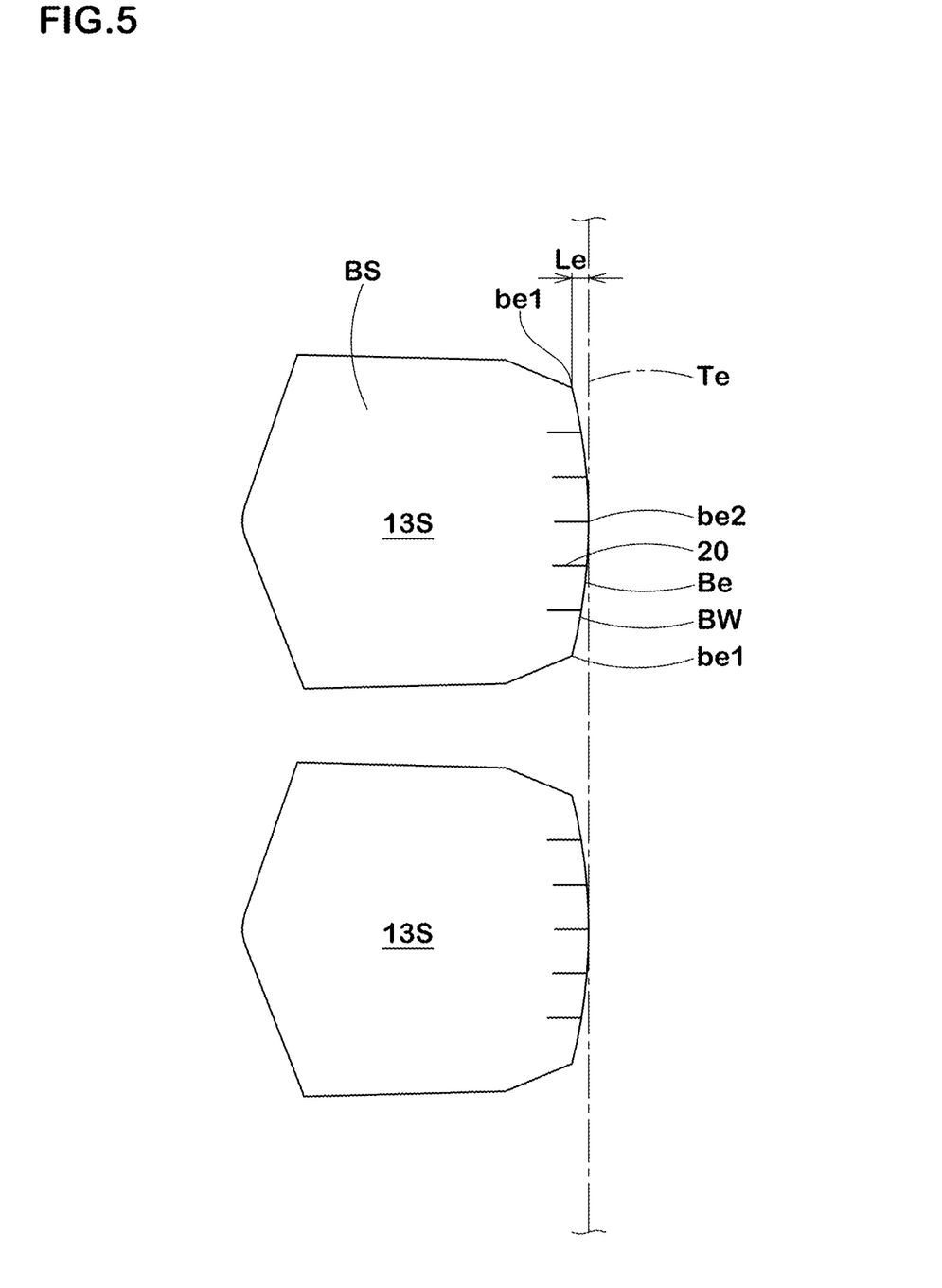
FIG. 5 is an enlarged perspective view of a shoulder block of another embodiment.

To further suppress occurrence of shoulder wear and triangular wear, as shown in FIG. 5, it is preferred to regulate the shape of a block outside edge Be where a block tread surface BS and a tire axially outside block wall surface BW of the shoulder block 13S intersect. Specifically, the block outside edge Be is shaped by a convex curve that includes a protrusion portion be2 most protruding outwardly in the tire axial direction between both circumferentially end points be1 and be1 of the block outside edge Be. In this example, the block outside edge Be is preferably shaped in an arc curve line. Alternatively, the block outside edge Be may be shaped in an almost V-shaped curve line with straight lines between the protrusion portion be2 and the end points be1. The protrusion portion be2 is positioned in alignment with the tread edge Te.

Figure 6:
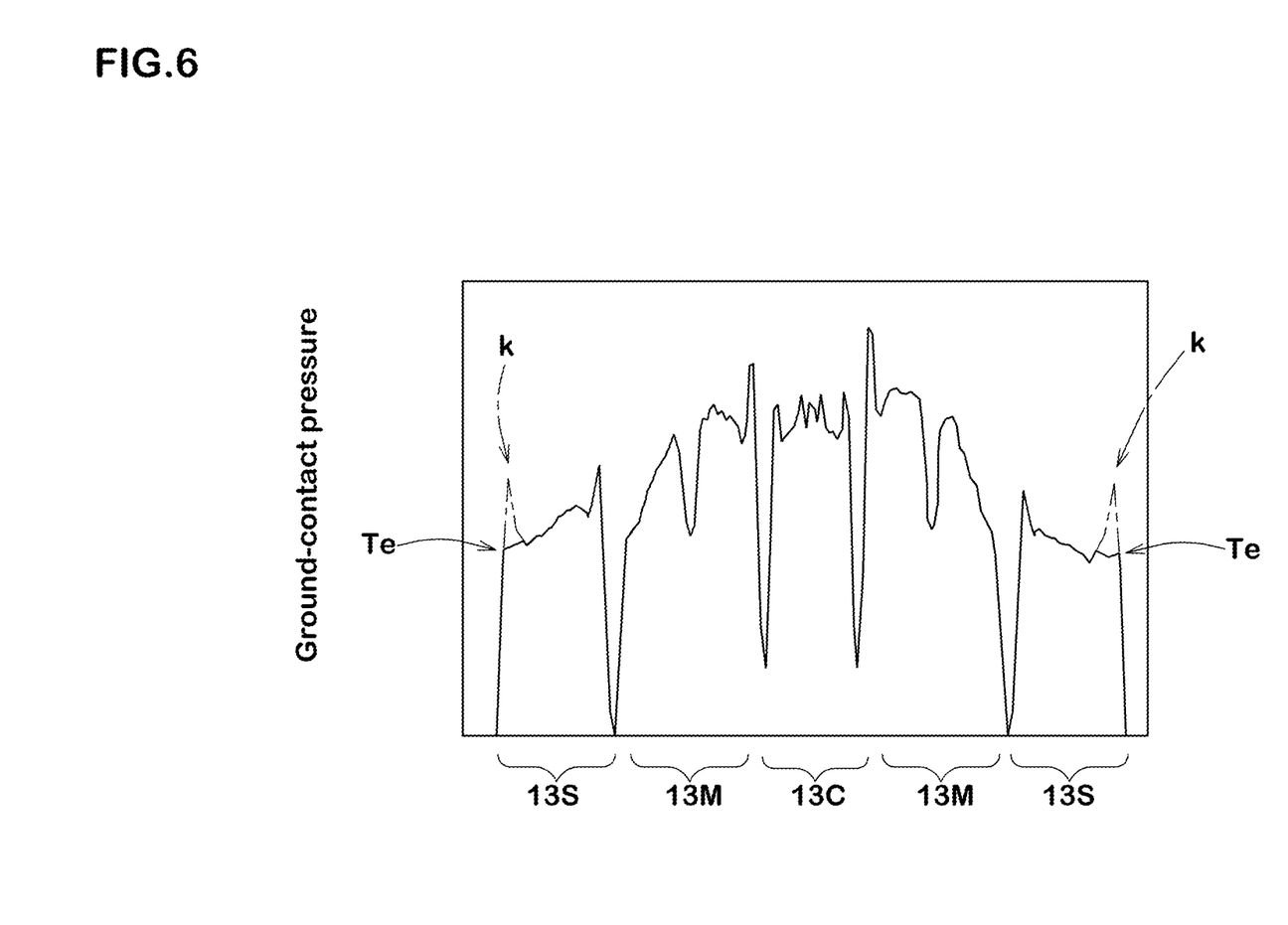
FIG. 6 is a graph illustrating one example of ground-contact pressure distribution.

In this example, a tire axial distance Le between the both end points be1 and the protrusion portion be2 at the block outside edge Be is preferably set within a range of 2 mm or more and 5 mm or less. By configuring the block outside edge Be in this manner, it is possible to further suppress formation of ground-contact pressure rising portions k with a peak-like rise in ground-contact pressure at the tread edges Te, as shown in FIG. 6, for example, thereby producing the effect of suppressing triangular wear. When the distance Le is smaller than 2 mm, the effect of suppressing triangular wear is not sufficiently produced. In contrast, when the distance Le exceeds 5 mm, the ground-contact pressure at the tread edges Te excessively decreases, which may result in occurrence of shoulder wear. FIG. 6 is a ground-contact pressure distribution at a ground-contact center t (shown in FIG. 4) on the ground-contact plane F.

The shoulder blocks 13S may be provided with a plurality of sipings 20 extending in the tire axial direction across the block outside edge Be.

As in the foregoing, a particularly preferred embodiment of the present invention is described. However, the present invention is not limited to the illustrated embodiment but can be carried out in various modified modes.

EXAMPLES

Figure 4:
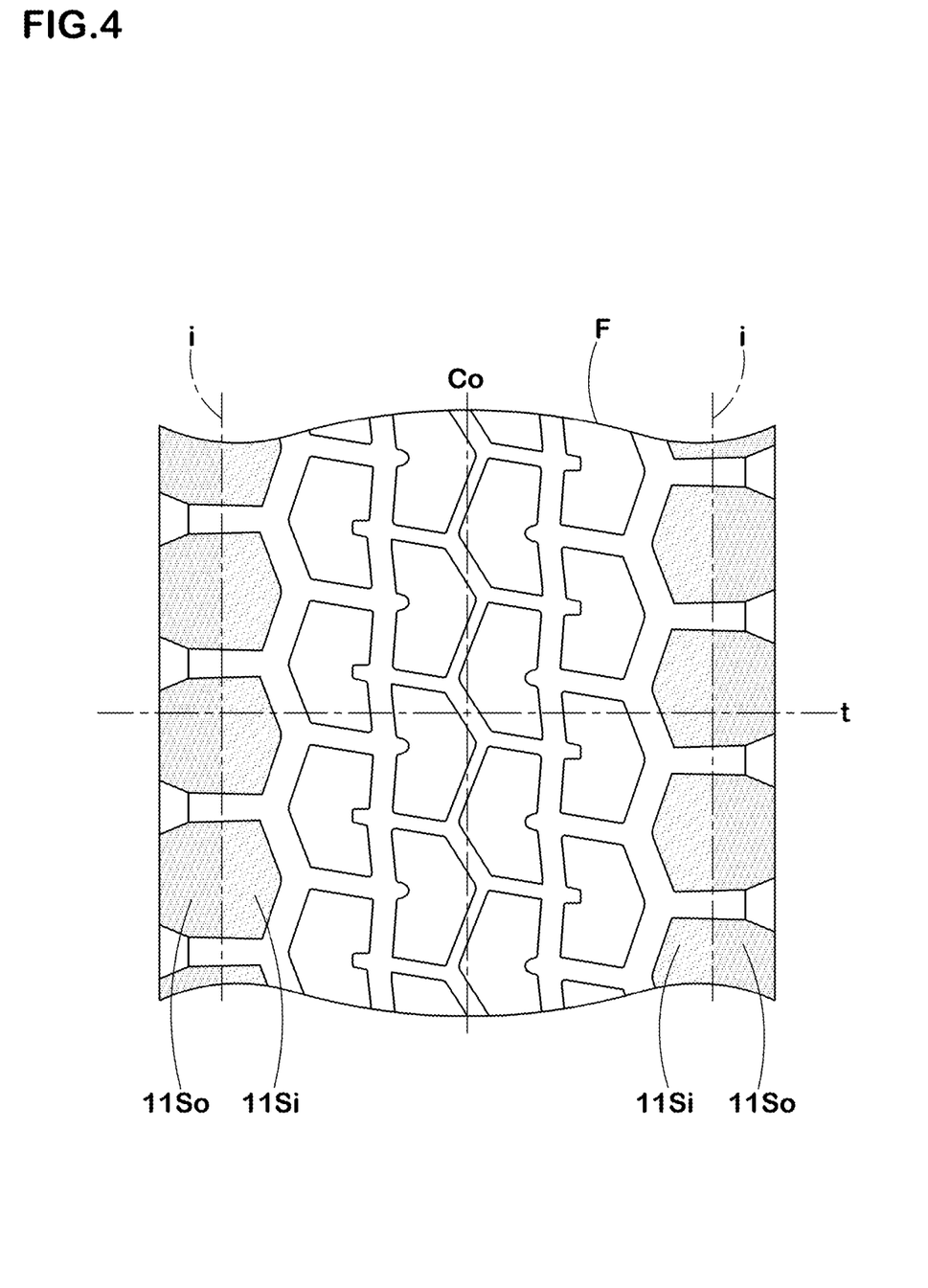
FIG. 4 is a diagram of a ground-contact surface of the tire under a normal load.

The heavy duty tire 1 with a tire size 275/80R22.5 were prototyped so as to be based on the tread pattern shown in FIG. 1 and have the tread profile line J shown in FIG. 4. Then, the prototyped tires were tested and compared to one another in shoulder wear resistance and triangular wear resistance. The tires were identical in the radius of curvature R1, and had the ratio R2/R1 and the ratio He/H varied by changing the radius of curvature R2 and the position of the intersection point Q (distance Ly). For items other than those described in Table 1, the tires were virtually under the same specifications.

The test methods are as follows:
(1) Triangular Wear Resistance and Shoulder Wear Resistance:

The tires shown in Table 1-1 and Table 1-2 were mounted on front wheels of a vehicle (2-D4GV W25-ton truck) under the conditions of a rim (22.5×7.50) and an internal pressure (900 kPa), and run for six months under the condition of highway usage rate of 80% or more. Then, after the running, the outer appearances of the tires were visually inspected to estimate in occurrence of triangular wear and shoulder wear at the following three stages:
1—There is uneven wear (shoulder wear or triangular wear)
2—There is slight uneven wear (shoulder wear or triangular wear)
3—There is no uneven wear (shoulder wear or triangular wear).

The tires shown in Table 1-3 were run for 10 months under the condition of highway use rate of 80% or more. Then, after the running, the outer appearances of the tires were visually inspected to estimate in occurrence of triangular wear and shoulder wear at the following three stages:
1—There is uneven wear (shoulder wear or triangular wear)
2—here is slight uneven wear (shoulder wear or triangular wear)
3—There is no uneven wear (shoulder wear or triangular wear).

TABLE 1-1

| | Comparative Example 1 | Example 1 | Example 2 | Example 3 | Example 4 | Comparative Example 2 | Comparative Example 3 | Example 5 | Example 6 | Example 7 | Example 8 |
|---|---|---|---|---|---|---|---|---|---|---|---|
| Tread profile line | | | | | | | | | | | |
| Curvature radius ratio R2/R1 | 0.18 | 0.20 | 0.36 | 0.43 | 0.50 | 0.63 | 0.27 | 0.27 | 0.27 | 0.27 | 0.27 |
| Distance ratio He/H | 0.91 | 0.90 | 0.90 | 0.88 | 0.90 | 0.91 | 0.42 | 0.50 | 0.55 | 0.66 | 0.91 |
| Ground-contact pressure ratio PSo/PSi | 0.88 | 0.90 | 0.94 | 0.91 | 1.01 | 1.07 | 1.10 | 1.02 | 0.99 | 0.98 | 0.96 |
| Block outside edge - Le (mm) | | | | | | straight line 0 | | | | | |
| Triangular wear resistance | 3 | 3 | 3 | 3 | 2 | 1 | 1 | 2 | 3 | 3 | 3 |
| Shoulder wear resistance | 1 | 2 | 3 | 3 | 3 | 3 | 3 | 3 | 3 | 3 | 3 |

TABLE 1-2

|  | Example 9 | Comparative Example 4 | Example 10 | Example 11 | Example 12 |
|---|---|---|---|---|---|
| Tread profile line |  |  |  |  |  |
| Curvature radius ratio R2/R1 | 0.27 | 0.27 | 0.27 | 0.43 | 0.43 |
| Distance ratio He/H | 0.99 | 1.05 | 0.91 | 0.88 | 0.88 |
| Ground-contact pressure ratio PSo/PSi | 0.89 | 0.85 | 1.03 | 0.91 | 0.84 |
| Block outside edge - | | | Straight line | | |
| Le (mm) | | | 0 | | |
| Triangular wear resistance | 3 | 3 | 2 | 3 | 3 |
| Shoulder wear resistance | 2 | 1 | 3 | 3 | 2 |

TABLE 1-3

|  | Example 13 | Example 14 | Example 15 | Example 16 | Example 18 |
|---|---|---|---|---|---|
| Tread profile line |  |  |  |  |  |
| Curvature radius ratio R2/R1 | 0.27 | 0.27 | 0.27 | 0.27 | 0.27 |
| Distance ratio He/H | 0.91 | 0.91 | 0.91 | 0.91 | 0.91 |
| Ground-contact pressure ratio PSo/PSi | 0.95 | 0.94 | 0.96 | 0.89 | 0.83 |
| Block outside edge - | Convex arc | Convex arc | Straight line | Convex arc | Convex arc |
| Le (mm) | 2 | 5 | 0 | 7 | 10 |
| Triangular wear resistance | 3 | 3 | 2.5 | 3 | 3 |
| Shoulder wear resistance | 3 | 3 | 3 | 2.5 | 2 |

As shown in Table 1-1 and Table 1-2, it has been confirmed that the tires in the embodiment of the present invention were effective in suppressing occurrence of triangular wear and shoulder wear. In addition, as shown in Table 1-3, it has been confirmed that the tires in the embodiment of the present invention could be further effective in suppressing occurrence of triangular wear and shoulder wear by shaping the tire axial outside of the shoulder blocks in a convex curve and setting the distance Le to 2 to 5 mm.

EXPLANATION OF REFERENCE

1 Heavy duty tire
2 Tread portion
10 Circumferential main groove
10S Shoulder circumferential main groove
11S Shoulder land portion
11So outside land portion
11Si Inside land portion
12S shoulder lateral groove
13S Shoulder block
Be Block outside edge
be1 End point
be2 Protrusion portion
BS Block tread surface
BW Block wall surface
Co Tire equatorial plane
O1, O2 Arc center
i width center line
J Tread profile line
J1 First arc portion
j1 Extended line
J2 second arc portion
Te Tread edge
Te' virtual tread edge
Qc Equatorial point
Xa Radial line
Xb Radial line

The invention claimed is:

1. A heavy duty tire configured such that
   a tread portion is provided with circumferential main grooves including a shoulder circumferential main groove positioned closest to a tread edge to form a shoulder land portion between the shoulder circumferential main groove and the tread edge, and
   the shoulder land portion is divided into a plurality of shoulder blocks by shoulder lateral grooves spaced in a tire circumferential direction, wherein
   on a meridional cross-section of a tire in a 5% internal pressure state where the tire is mounted on a normal rim and charged with a 5% internal pressure of a normal internal pressure,
   a tread profile line on a surface of the tread portion is formed from a first arc portion with a radius of curvature R1 having an arc center on a tire equatorial plane and a second arc portion with a radius of curvature R2 intersecting with the first arc portion at an intersection point Q,
   an arc center of the second arc portion is positioned on a radial line passing through the intersection point Q,
   a ratio He/H between a tire radial distance He from an equatorial point at which the tread profile line intersects the tire equatorial plane to the tread edge and a radial distance H from the equatorial point to a virtual tread edge at which a radial line passing through the tread edge intersects an extended line of the first arc portion is 0.5 or more and less than 1.0, and wherein
   a ratio R2/R1 between the radius of curvature R2 and the radius of curvature R1 is 0.2 or more and 0.5 or less.

2. The heavy duty tire according to claim 1, wherein
   when the shoulder land portion is divided by a width center line of the shoulder land portion into a tire axially outside land portion and a tire axially inside land portion,
   in a ground-contact plane of a tire when a normal load is applied to the tire in a normal state that is mounted on a normal rim and charged with a normal internal pressure,
   a ratio PSo/PSi between an average PSo of ground-contact pressure at the outside land portion and an average PSi of ground-contact pressure at the inside land portion is 0.9 or more and 1.0 or less.

3. The heavy duty tire according to claim 1, wherein
a block outside edge at which a block tread surface of the shoulder block and a block wall surface on the tire axial outside intersects has a convex curve with a protrusion protruding most outwardly in the tire axial direction between both end points of the block outside edge in the tire circumferential direction, and
a tire axial distance between the both end points and the protrusion is 2 mm or more and 5 mm or less.

4. The heavy duty tire according to claim 2, wherein
a block outside edge at which a block tread surface of the shoulder block and a block wall surface on the tire axial outside intersects has a convex curve with a protrusion protruding most outwardly in the tire axial direction between both end points of the block outside edge in the tire circumferential direction, and
a tire axial distance between the both end points and the protrusion is 2 mm or more and 5 mm or less.

* * * * *